United States Patent Office 3,444,873
Patented May 20, 1969

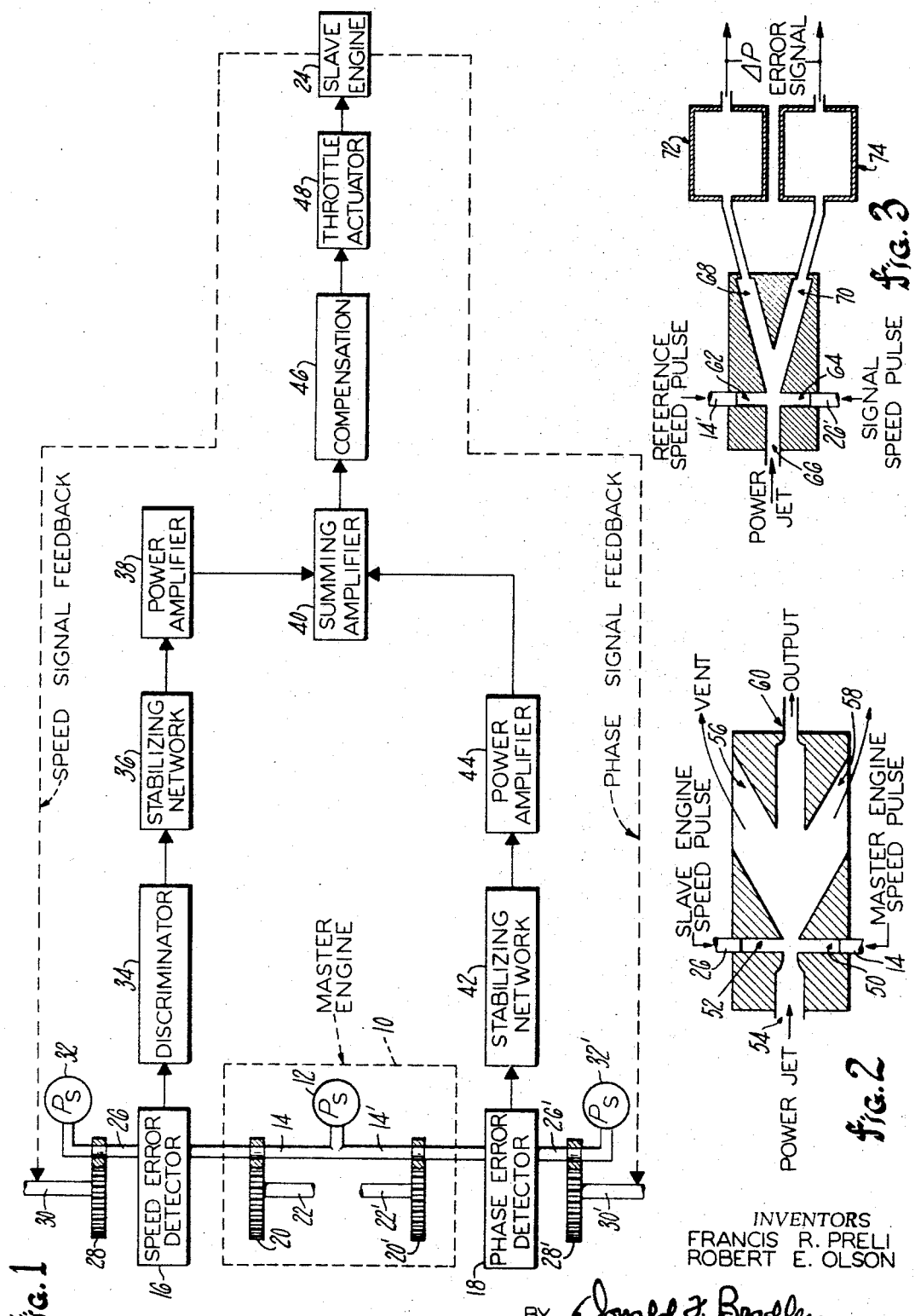

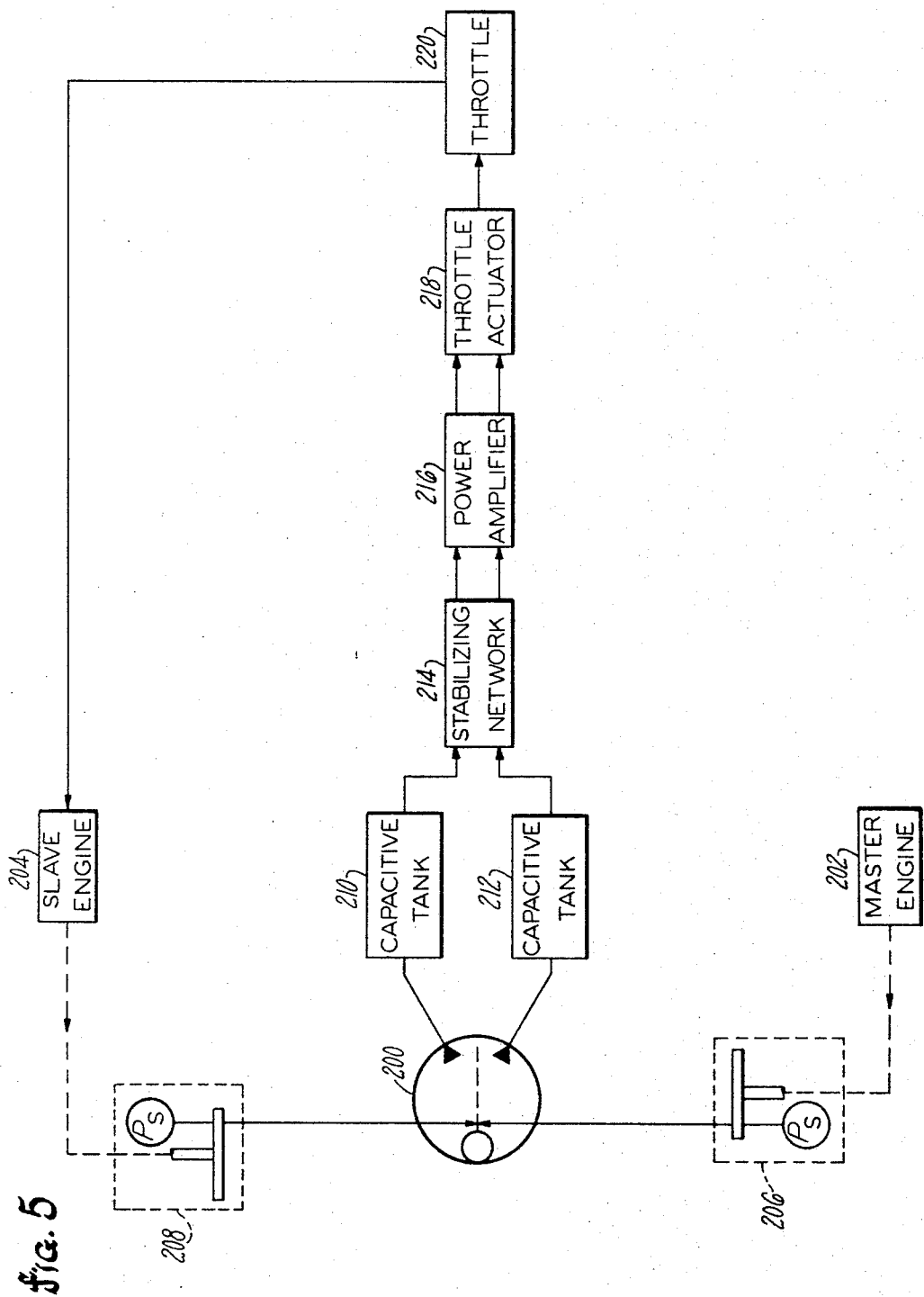

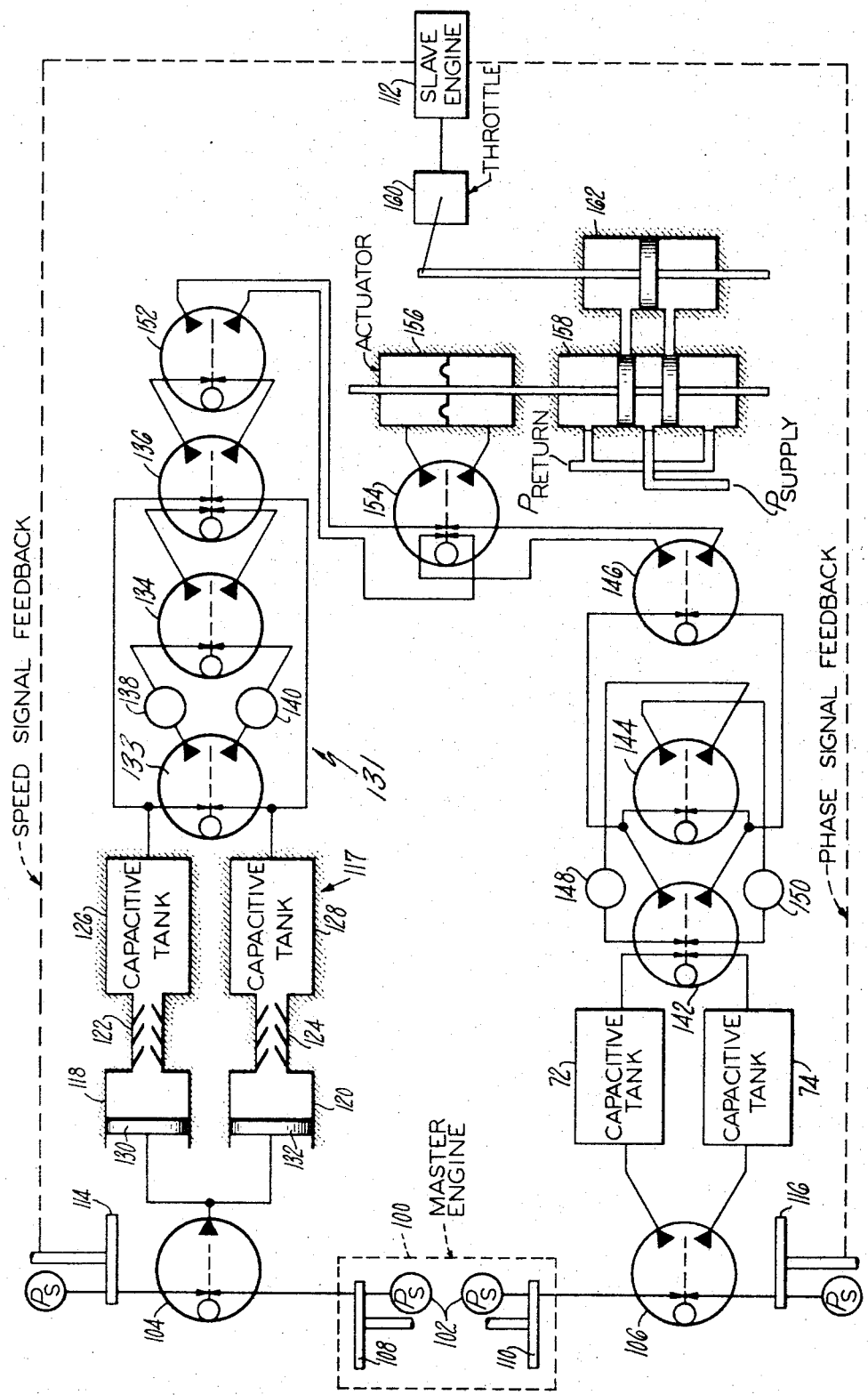

3,444,873
FLUID SYNCHRONIZING SYSTEM FOR
ROTATING DEVICES
Francis R. Preli, East Hartford, and Robert E. Olson,
Vernon, Conn., assignors to United Aircraft Corporation, East Hartford, Conn., a corporation of Delaware
Filed Apr. 3, 1967, Ser. No. 628,014
Int. Cl. G05d *13/30;* F15c *1/04*
U.S. Cl. 137—26                                  10 Claims

ABSTRACT OF THE DISCLOSURE

A synchronizing and synchrophasing system for speed and phase control of rotating devices such as propellers utilizing pure fluid components. Fluid amplifiers sense the speed and phase difference between a master device and the slave device, produce an error signal in response to any deviations, and provide an output signal to correct the error.

Background of the invention

This invention relates to fluidic elements, and more particularly to a fluidic synchronizing and synchrophasing system which provides phase and speed synchronization between engines in a multiple engine power system. An additional feature of this invention is a fluidic synchronizing system using a single bistable fluidic element to sense both phase angle error and differences in speed between control signal pulses.

Considerable interest has been shown in the application of fluidic devices to computation and control systems. A fluidic device is one in which a fluid power stream is used to perform a variety of functions without moving mechanical parts. Such devices and their principles of operation are well known in the patent art, and have been extensively described in the literature. These devices perform many of the functions of present day electronic and mechanical components while better fulfilling the operational requirements for many control systems. The major advantages of fluidic devices as compared to existing components are their improved reliability, ruggedness, temperature characteristics and low cost. As compared with hydromechanical or mechanical components, fluidic devices also have the possibility of improved frequency response.

This invention describes a fluid operated system which utilizes the flow of fluid to perform control functions analogous to functions now performed by electronic and mechanical components and systems. Fluidic elements such as amplifiers and detectors will respond to various input signals from a controlled device and, by proper arrangement and design, will produce an output signal to regulate the controlled device.

Specifically this invention relates to a speed control and synchronizing and synchrophasing system for maintaining a preselected speed and phase relationship between multiple rotating devices such as, but not limited to, propellers, turbines, rotary and reciprocating engines and compressors, etc., by employing a control technique which utilizes pure fluid amplifiers for sensing speed and phase differences, producing an error signal in response to these deviations, and providing an output signal which can be used to correct the error. Synchronizing and synchrophasing systems utilizing electronic, mechanical and hydromechanical components are well known in the art and are widely used to reduce both noise and vibration caused by the interaction of unsynchrophased multiple rotating equipment such as propellers.

The advantage of this invention is an improved mechanism for accomplishing speed control and speed and phase synchronization using pure fluid devices which are superior to conventional electronic and electromechanical methods by virtue of their lighter weight, lower cost, greater operating temperature range, high reliability, and their ability to operate in higher vibration and radiation environments. A control system based on these principles is ideally suited for governing and synchrophasing aircraft propeller and turbojet installation since the entire device can be built as an integral part of the propeller governor or fuel metering system, thereby eliminating the necessity of remotely locating the required equipment in present electronic and mechanical synchrophaser systems because of severe environmental restraints.

Summary of invention

It is therefore an object of this invention to provide a system for speed and phase synchronization between rotating devices.

Another object of this invention is the use of fluidic elements to provide speed and phase control between engines in a multiple engine power system.

A further object of this invention is a novel synchronizing and synchrophasing system for rotating devices in which a single fluid amplifier senses both phase angle error and differences in speed between control signal pulses.

These and other objects of this invention are more fully explained in the following description and claims, read in conjunction with the accompanying drawings.

Brief description of the drawings

FIG. 1 is a schematic block diagram of a typical speed and phase synchronization system for multiple rotating components;

FIG. 2 shows schematically a fluidic speed error detector;

FIG. 3 shows schematically a fluidic phase error detector;

FIG. 4 shows schematically a speed and phase synchonizer for multiple rotating components utilizing fluidic components; and FIG. 5 shows a synchronizing and synchrophasing system using a single bistable element for both speed and phase control.

Description of the preferred embodiment

Referring to FIG. 1, there is shown in block diagram form a schematic of the operation of a typical speed and phase synchronization system for multiple rotating components. The system will be described with reference to engines, but it is obvious that other components may be controlled by the system.

In FIG. 1, the master engine is shown by reference numeral 10. Speed and phase control is achieved by generating pneumatic pulses from the master and slave engines and comparing them to produce an error signal. A source of fluid under pressure Ps, shown at 12, is fed through supply lines 14 and 14′ to speed error detector 16 and phase error detector 18 respectively. Inserted in lines 14 and 14′ are control wheels 20 and 20′ driven by the master engine 10 through shafts 22 and 22′, the wheels having one or more holes therein to pass the fluid from supply 12 to the detectors 16 and 18 in pulses which have a rate proportional to the speed of the master engine. As will be described, when the master and slave engines are at the same speed, the pulses will be at the same rate and timing between pulses from the two engines is indicative of phase differences therebetween. The method of driving the wheels 20 from the master engine 10 is well known. Any other method of producing pulses indicative of the speed and relative phase of master engine 10 may also be used. For example, a master oscillator may be employed. Also, only one control wheel may be required to supply both speed and phase pulses from the master engine, although two are shown for clarity.

A slave engine 24 produces speed and phase pulses through lines 26 and 26'. Control wheels 28 and 28' driven through shafts 30 and 30' attached or connected to the slave engine interrupt the source of fluid pressure Ps indicated at 32, and supply to speed error detector 16 and phase error detector 18 pulses proportional to the speed of slave engine 24. Only a single control wheel and pulse train may be required, but two are shown for ease of description.

Speed pulses from master engine 10 through line 14 and speed pulses from slave engine 24 through line 26 are both fed to speed error detector 16 where they produce a speed difference signal. FIG. 2 shows the preferred speed error detector. Likewise pulses from master engine 10 through line 14' and pulses from slave engine 24 through line 26' are both fed to phase error detector 18 where they produce both a phase and speed difference signal with the phase difference signal being dominant when the master and slave engine are close to speed sychronization. FIG. 3 shows a preferred phase error detector.

Referring back to FIG. 1, the speed difference signal generated in speed error detector 16 is fed to discriminator 34 where a speed error signal is generated. The speed error signal is transmitted to stabilizing network 36 where lead or lag compensation or both is provided to match the control to the dynamic response characteristics of the device being controlled. The signal leaving stabilizing network 36 is fed to power amplifier 38, and then to summing amplifier 40 where it is combined with the phase error signal.

The phase difference signal from phase error detector 18 is fed to stabilizing network 42 where it is compensated, and then to power amplifier 44 and summing amplifier 40.

The summing amplifier 40 combines both speed error and phase error signals and feeds the combined signals to compensation network 46, if required, where additional dynamic matching between the control element and the signal is achieved. The signal is then directed to a speed control or throttle actuator 48 on the slave engine 24 to control the flow of fuel or the pitch change mechanism of a propeller to control speed. Feedback signals of both speed and phase are generated and coupled to their respective sensors.

The speed error detector 16 is shown in FIG. 2. The detector is similar to a well known fluid amplifier, and is a momentum exchange amplifier having a single output. The reference speed pulse generated by the master engine in line 14 or a pulse from a pneumatic pulse oscillator is introduced into one of the control jets 50. The speed signal from the slave engine, generated as shown in FIG. 1 by use of the pneumatic jet interrupter wheel or disc 28, is introduced into the other control jet 52 of the speed error detector through line 26. These signals cause the power jet, introduced into port 54 from a source Ps, not shown, to be deflected between vent ports 56 and 58 at a frequency which is proportional to the difference between the frequency of the master engine speed pulse and the slave engine speed pulse. As the power jet is deflected past output port 60, an output signal proportional to the difference frequency is produced, and this difference frequency is introduced into discriminator 34 in FIG. 1 which determine the direction and amplitude of the speed error, and demodulates the error into a pressure difference signal.

The phase error detector 18 of FIG. 1 is shown in FIG. 3. This device is a wall attachment bistable amplifier having its output coupled to capacitance volumes. In operation, the speed pulse from the master engine or oscillator is fed through line 14' to control jet 62, and the pulse from the slave engine is fed through line 26' to control jet 64. A source of fluid power Ps, not shown, is fed into port 66. If the frequencies of the master and slave pulses are different, the jet will spend unequal amounts of time in each output. If the frequencies are equal, indicating speed synchronization, a phase difference between the pulses will also cause the jet to spend unequal amounts of time in each output. Only when the pulses are of equal frequency and in phase will the jet spend equal amounts of time in each output.

Each of the output ports 68 and 70 is connected through fluid connectors to capacitive tanks 72 and 74. When the pulses are of equal frequency and in phase, the output pressures from each capacitance tank will be equal, indicating no phase error. If the timing of the pulses from the master and slave engines is different, an error signal will exist as indicated by the pressure difference at the output of the capacitance tanks. This error is then processed through the control loop and the necessary corrective action is taken to reduce the phase error to zero.

Since an error signal as indicated by the difference in pressure in capacitive tanks 72 and 74 will exist also for a difference in input frequencies, the phase error detector may also be used concurrently as a speed error detector as shown in FIG. 5.

FIG. 4 is a schematic of the phase and speed synchronizing system composed entirely of fluidic elements. Master engine 100 contains a source of power supply fluid 102, Ps, and pulses indicative of master engine speed and phase are fed to speed error detector 104 and phase error detector 106 through jet interrupter discs 108 and 110 driven from the master engine 100. Slave engine 112 also produces pulses which are fed to speed error detector 104 and phase error detector 106 by means of interrupter discs 114 and 116 connected with the slave engine. As indicated previously only one interrupter disc may be required for the master and slave engines. Speed error detector 104 operates as described previously in connection with FIG. 2, and the output from the speed error detector is fed into discriminator 117.

The discriminator 117 consists of two parellel resonant cavities 118 and 120 tuned to different frequencies, each of which is coupled to a pure fluid diode 122 and 124 and a capacitive tank or volume 126 and 128. The diode and capacitance volume constitute a pure fluid halfwave rectifier. An adjustable piston 130 and 132 is inserted into each resonant cavity to tune the frequency of resonance of each cavity.

When the slave engine 112 is on speed, a small frequency difference is made to exist between the reference or master engine and the slave engine outputs. The two resonant circuits 118 and 120 are then tuned to frequencies above and below this frequency difference at null. The relative frequencies of the resonant cavities are chosen to provide an adequate range of speed error discrimination and to provide equal signals at the outputs of the rectifiers when the slave engine is on speed. When the slave engine is off speed, the output from one of the resonant circuits increases, while the output from the other resonant circuit decreases. The pressure signals from the respective halfwave rectifiers indicate the magnitude of the error and its sense. The resulting error signal is then processed through the control loop and the necessary corrective action is taken to reduce the speed error to zero.

The operation of phase error detector 106 in conjuntion with capacitive tanks 72 and 74 has already been explained in conjunction with FIG. 3.

Both speed and phase error signals are transmitted to stabilizing networks which provide lead or lag compensation or a combination of both to match the control system to the dynamic response characterstics of the engine being controlled. The output of discriminator 116 in FIG. 4 is shown being transmitted to a lag-lead circuit, and the output of the phase error detector 106 via capacitive tanks 72 and 74 is transmitted to a lead-lag circuit. FIG. 4 thereby illustrates both types of compensating networks. It should be understood, however, that in practice either a lag-lead or lead-lag circuit or a combination of both may be employed to match the speed control or to match the phase control, the particular requirements of the engine being controlled determining which type of compensation is required. It should also be recognized that other types of compensation may be used.

The lag-lead circuit 131 in the speed error loop consists of two momentum exchange proportional amplifiers 133 and 134 and a summing amplifier 136 connected in series. The output of the discriminator 116 is applied immediately as a control signal to one pair of inlet ports in summing amplifier 136. The output of the discriminator is also connected to the input ports of proportional amplifier 133. The output of this amplifier is connected through series capacitive tanks 138 and 140 to the input of proportional amplifier 134. The output of proportional amplifier 134 is also applied to a pair of input ports at summing amplifier 136. The operation of a fluidic lag-lead circuit as just described is well known in the art, and need not be described in detail here.

The output of the phase error detection loop from capacitive tanks 72 and 74 is fed to one pair of input ports as a control signal to a summing amplifier 142. The output from summing amplifier 142 is applied as an input signal to proportional amplifier 144, and also applied as an input signal to a second proportional amplifier 146. The output from proportional amplifier 144 is fed back through series capacitive tanks 148 and 150 to a second pair of input ports in summing amplifier 142. This negative feedback through the capacitive tanks acts as a delay and provides the lag in the system.

Proportional amplifier 146 in the phase error loop, and proportional amplifier 152 in the speed error loop are inserted in the system for additional amplification. These power amplifiers may not be necessary, or additional power amplification stages may be necessary to achieve the required system gain.

The power amplifier output signals are transmitted to a summing amplifier 154 and added so that the summing amplifier output signal depends on the sum of the speed and phase error signals. The output from summing amplifier 154 is used to drive a pneumatic actuator 156. The pneumatic actuator 156 is part of a servo actuator which drives a hydraulic spool valve 158. The hydraulic spool valve controls the position of throttle 160 through a hydraulic throttle actuator 162. Throttle 160 regulates the flow of fuel or other speed control mechanism in slave engine 112. Speed changes in the slave engine as the result of the throttle actuation are fed back to the speed and phase error detectors by means of interrupter discs 114 and 116 to complete the feedback system.

FIG. 5 shows schematically a synchronizing and synchrophasing system using a single bistable amplifier which may be used to control both speed and phase error. Referring to FIG. 5, bistable amplifier 200 receives fluid pulses from both master engine 202 and slave engine 204, the pulses being generated by control wheels connected to each engine as described previously and shown in blocks 206 and 208. Capacitive tanks 210 and 212 are connected to the output lines of bistable amplifier 200, and the pressure difference between the two capacitive tanks is fed to stabilizing network 214 which provides the desired compensation. The compensated signal is amplified by power amplifier 216, and the amplifier output is fed to throttle actuator 218 which varies the flow of fuel to the engines by means of throttle 220.

Both speed and phase may be controlled by the system of FIG. 5. When the master and slave engines are at different speeds, the frequency of the pulses from one of the engines will be different from the frequency of the pulses from the other engine. Since both pulse trains are fed to bistable amplifier 200, the fluid stream in the bistable amplifier will dwell for a longer period of time on one side of the amplifier, thereby producing a higher pressure in one capacitive tank than in the other. The reason for this is the finite switching time of the bistable amplifier 200. If the amplifier had an infinite switching time, the output would have an average value of zero. For example, if master engine 202 is at a higher speed than slave engine 204, the higher frequency of pulses from this engine will produce a higher pressure in tank 210. The pressure signal will cause the fuel flow to slave engine 204 to be increased to equalize the speed of the two engines.

Once the two engines are at the same speed, the frequency of the pulses from both engines will be equal, but unless the engines are in phase, the pulses from one engine will continually lead or lag the pulses from the other engine. Any out of phase condition will result in the bistable amplifier 200 generating a higher pressure in one capacitive tank than in the other, since each pulse occurrence will cause the output from the bistable amplifier to switch output channels. Only when the engines are in phase will the pressure in both tanks be equal, and this condition will only exist when the pulse from each engine follows the pulse from the other engine by 180°, i.e., when the pulses alternate equally in time to cause the output from the amplifier 200 to dwell in each output channel for an equal time. One method for accomplishing this is to set the rotating wheel in each slave engine to be exactly 180° out of phase with the rotating wheel in the master engine. Thus when the engines are in phase, the pulses will be exactly 180° out of phase, and produce equal dwell times for the output from the bistable amplifier. This expedient would have no effect on the frequency or the speed error loop.

Thus in FIG. 5 only one error signal is necessary, the error indicating speed error when the speeds of the two engines are different, and phase error when the speeds are equal.

While the preferred embodiments of this invention have been described, it is obvious that changes may be made to the system by those skilled in the art without departing from the scope of the invention as hereinafter claimed.

We claim:
1. In a control system for controlling the speed and phase of a rotating body relative to a reference,
fluid means responsive to a difference in speed between said rotating body and a reference for adjusting the speed of said rotating body to null said speed difference,
fluid means for generating a reference signal indicative of the desired phase of said rotating body,
fluid means for generating a signal commensurate with the actual phase of said rotating body,
fluid comparator means responsive to a difference between said reference phase signal and said actual phase signal for producing a phase error signal,
and means responsive to said phase error signal for adjusting the phase of said rotating body to null said error signal.

2. In a control system for controlling the speed and phase of a rotating body relative to a reference,
fluid means for generating a reference signal indicative of the desired speed and phase of said rotating body,
fluid means for generating a second signal commensurate with the actual speed and phase of said rotating body,
fluid comparator means receiving said reference signal and said second sginal and producing a fluid error signal, said error signal being indicative of speed error when the speed of said rotating device is different from the desired speed and indicative of phase error when the speed of said rotating device is equal to the desired speed, and means responsive to said fluid error signal for selectively adjusting the speed and phase of said rotating body to null said error signal.

3. In a control system for controlling the speed and phase of a rotating body relative to a reference, means providing a first pulsed fluid reference signal commensurate with a predetermined speed, means producing a second pulsed fluid signal commensurate with the actual speed of rotation of said body, fluid comparator means for receiving said phase signals ond signals and producing a fluid speed error signal, means providing a first pulsed fluid reference signal commensurate with the actual phase of said rotating body, fluid compartor means for receiving said phase signals and producing a fluid phase error signal, and means receiving said speed and phase error signals for producing a control signal for varying the speed speed and phase of said rotary body to null said speed and phase error signals.

4. A control system according to claim 1 wherein said comparator means is a phase error detector comprising a bistable fluid element having two output passages, fluid capacitance means receiving fluid from each of said passages, and means for sensing the pressure difference between said capacitance means.

5. A control system according to claim 3 wherein said speed error signal producing means includes fluid discriminator means comprising two parallel resonant circuits of different tuned frequencies, each resonant circuit including a fluid diode and capacitance comprising a fluid halfwave rectifier.

6. A control system according to claim 3 wherein said phase error signal producing means includes a bistable amplifier having two outlets, a fluid capacitance chamber connected to each of said outlets, and means for detecting the difference in pressures between said chambers.

7. A control system as in claim 2 in which said comparator means comprises a bistable fluid amplifier.

8. A control system as in claim 5 and including means to vary the resonant frequencies of said resonant circuits.

9. A control system as in claim 7 and including capacitance chamber means connected to said bistable fluid amplifier.

10. A control system as in claim 3 and including fluid compensation means for stabilizing said fluid error signals.

References Cited

UNITED STATES PATENTS

| | | | |
|---|---|---|---|
| 3,228,602 | 1/1966 | Boothe | 137—81.5 X |
| 3,233,522 | 2/1966 | Stern | 137—36 X |
| 3,302,398 | 2/1967 | Taplin | 60—39.28 |
| 3,260,271 | 7/1966 | Katz | 137—81.5 X |
| 3,260,456 | 7/1966 | Boothe | 137—36 X |
| 3,292,648 | 12/1966 | Colston | 137—81.5 X |
| 3,302,398 | 2/1967 | Taplin | 60—39.28 |
| 3,383,038 | 5/1968 | Boothe | 137—81.5 X |

CLARENCE R. GORDON, *Primary Examiner.*

U.S. Cl. X. R.

137—36, 37

UNITED STATES PATENT OFFICE
CERTIFICATE OF CORRECTION

Patent No. 3,444,873                                              May 20, 1969

Francis R. Preli et al.

It is certified that error appears in the above identified patent and that said Letters Patent are hereby corrected as shown below:

Column 6, line 70, "sginal" should read -- signal --. Column 7, lines 11 and 12, "phase signals ond" should read -- first and second --; line 19, cancel "speed".

Signed and sealed this 14th day of April 1970.

(SEAL)
Attest:

Edward M. Fletcher, Jr.

Attesting Officer

WILLIAM E. SCHUYLER, JR.
Commissioner of Patents